United States Patent [19]
Mannion et al.

[11] 3,729,051
[45] Apr. 24, 1973

[54] PROCESS FLUID FLOW REGULATION SYSTEMS

[76] Inventors: Gerald F. Mannion, 608 Bowlingreen Court, Naperville; James R. Mannion, 10336 S. Kolmar, Oak Lawn, both of Ill.

[22] Filed: Aug. 17, 1971

[21] Appl. No.: 172,504

[52] U.S. Cl. ................ 165/22, 137/486, 137/597, 165/38
[51] Int. Cl. ........................................ F24h 3/00
[58] Field of Search ................ 137/98, 110, 486, 137/497, 499, 500, 501; 165/22, 35, 37, 38, 40

[56] References Cited

UNITED STATES PATENTS

| | | | |
|---|---|---|---|
| 3,147,797 | 9/1964 | Miner | 165/22 |
| 3,232,336 | 2/1966 | Leslie et al. | 165/38 |
| 3,441,045 | 4/1969 | Malone | 137/486 X |

*Primary Examiner*—Robert G. Nilson
*Attorney*—James B. Kinzer et al.

[57] ABSTRACT

A flow regulation unit and system for regulating the flow of chilled water, hot water, or other incompressible process fluid to a series of utilization stations having common feeder and return lines and each having its own inlet pump, comprising a bridge between the inlet and outlet connections of each utilization station, sensing means for sensing flow rates in the bridge, a regulating valve interposed in the bridge outlet, and a control, actuated by the sensing means, for adjusting the regulating valve to maintain the flow across the bridge within a limited range.

15 Claims, 6 Drawing Figures

Patented April 24, 1973

INVENTORS
GERALD F. MANNION
JAMES R. MANNION
BY
Kinzer, Dorn and Zickert
ATTORNEYS Patented April 24, 1973
3,729,051
3 Sheets-Sheet 3
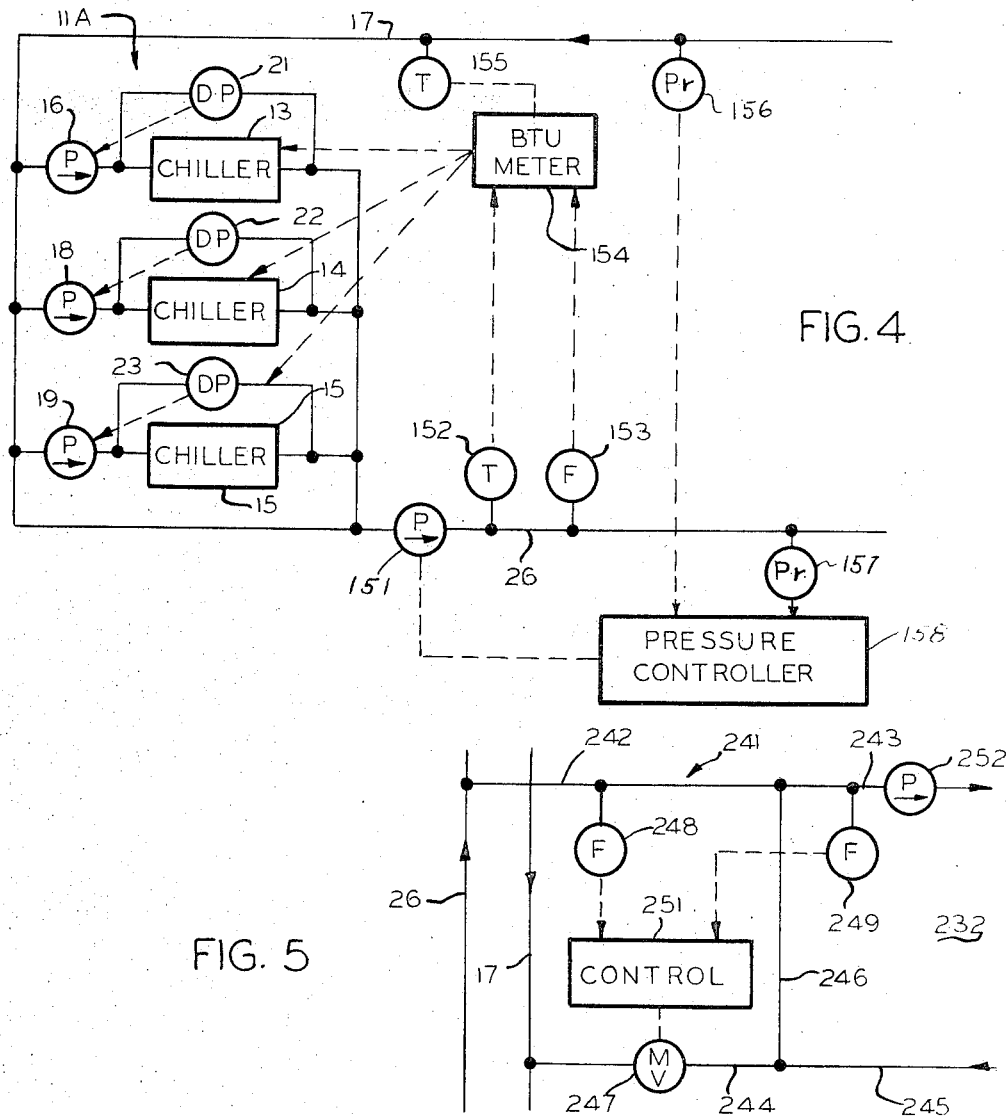
FIG. 4.
FIG. 5
FIG. 6
INVENTORS
GERALD F. MANNION
JAMES R. MANNION
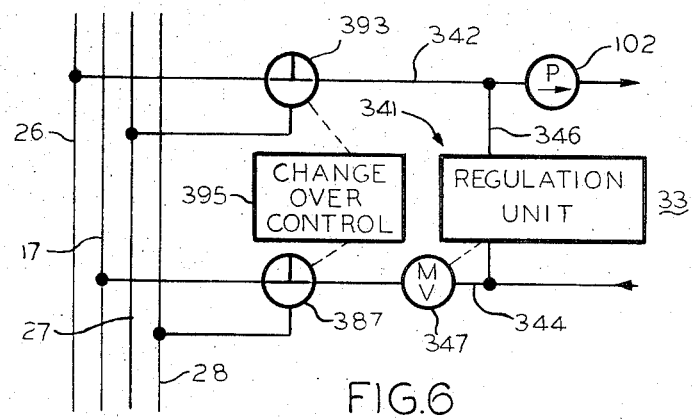
ATTORNEYS

3,729,051

PROCESS FLUID FLOW REGULATION SYSTEMS

BACKGROUND OF THE INVENTION

There are a number of applications in which a process fluid distribution system may be employed to furnish process fluid to a series of different utilization stations at which the flow requirements may vary over a rather wide range. Thus, in many large commercial, industrial, and even educational plants there are relatively critical requirements for chilled water, for hot water, or for both, at numerous locations which are widely separated from the heaters and chillers that constitute the basic water sources. A continuous flow of either hot water or chilled water at a given rate may be essential at any of the utilization stations. For example, the flow of chilled water to a computer, for cooling purposes, may be essential on a twenty-four hour basis. The computer, however, may be incorporated in the same distribution system with other equipment that requires a flow of chilled water only on an intermittent basis or only during limited hours of the day or on certain days of the week. Other installations in the same system may require either hot water or cold water, or both, for equally critical applications.

One frequently employed distribution system of this general kind employs a bridge circuit in the input of each utilization station. The bridge most frequently used is quite simple in construction and comprises a conduit directly interconnecting the inlet and the outlet of the utilization station. The bridge usually includes a throttling valve that is adjusted to afford a very limited flow or approximately zero flow in the bridge interconnection conduit when the utilization station is drawing its maximum flow from the distribution system. Adjustment must be made for maximum flow, since an inadequate flow from the feeder line and to the return line of the distribution system will result in recirculation of the water or other process fluid within the utilization station, with potentially disastrous results.

The conventional bridge arrangement, although it affords efficient and effective operation where the flow requirements of the utilization stations remain essentially constant, is inherently uneconomical and wasteful in operation in applications where there is any substantial decrease in the flow requirement of any major utilization station. Thus, in order to assure effective operation, the feeder and return lines of the distribution system, using conventional bridge regulation, must maintain a constant flow equal to the maximum requirement of the entire system. If this is not done, any given utilization station may fail to receive an adequate supply of the process water or other process fluid.

One proposed solution to this problem has been to incorporate flow sensors in each of the utilization stations, and to connect all of the flow sensors back to a central control point, usually located at the supply point for the distribution system. To be effective, an arrangement of this kind requires the incorporation of motor-actuated throttling valves at each utilization station in the system, together with relatively elaborate controls at a centralized control point and extensive wiring between the control point and all of the utilization stations. This results in an expensive control arrangement that may still require continuous monitoring by a control operator.

SUMMARY OF THE INVENTION

It is a principal object of the present invention, therefore, to provide a new and improved flow regulated distribution system for an incompressible process fluid, utilizing bridge circuits for the individual utilization stations of the distribution system, that inherently and effectively overcomes the difficulties and disadvantages of previously known systems as discussed above.

A particular object of the invention is to provide a new and improved bridge-type flow regulation unit for a process fluid distribution system, that makes practical the adjustment of the total flow in the distribution system without requiring interconnection of individual utilization stations in the system to a central control point.

Another object of the invention is to afford a new and improved flow regulation unit for a process fluid distribution system that can be constructed as a prefabricated unit adaptable for use at a variety of fluid utilization stations without substantial modification.

An additional object of the invention is to provide a new and improved regulated flow distribution system for an incompressible process fluid, such as hot water or cold water, that permits the practical application of thermal control as the basis for regulation for the fluid flow rate to the primary feeder and return lines of the system despite substantial variations in the actual flow requirements at individual utilization stations along the system.

A specific object of the invention is to provide a new and improved flow regulation unit for a process fluid distribution system that is capable of controlling the supply of two different process fluids, such as hot water and cold water, in alternation, to a single utilization station.

Accordingly, the invention relates to a regulated flow distribution system for an incompressible process fluid, as for example, hot water or cold water. The distribution system comprises a feeder line, a process fluid source including pumping means for pumping incompressible process fluid into the feeder line, a series of utilization stations distributed along the feeder line with each station having its own input pump, and a return line from all of the stations back to the process fluid source. The system further comprises a series of flow regulation units, one for each utilization station. Each regulation unit comprises a bridge inlet conduit connecting the feeder line to the inlet of its utilization station, a bridge outlet conduit connecting the utilization station back to the return line, and a bridge interconnection conduit between the bridge inlet and outlet conduits. An adjustable throttling valve is interposed in the bridge outlet conduit. The regulation unit further includes sensing means connected to at least one of the bridge conduits and to the regulating valve to continuously adjust the regulating valve and maintain the flow rate in the bridge interconnection conduit within a given limited range over a substantial range of absolute inlet flow rates.

BRIEF DESCRIPTION OF THE DRAWINGS

FIG. 4 illustrates a modification providing for thermal control of chilled water flow in a system like that of FIG. 1;

FIG. 5 is a schematic diagram of a modified flow regulation unit according to the invention; and FIG. 6 illustrates a modification of a part of the system of FIG. 1.

DESCRIPTION OF THE PREFERRED EMBODIMENTS

Figure 1:
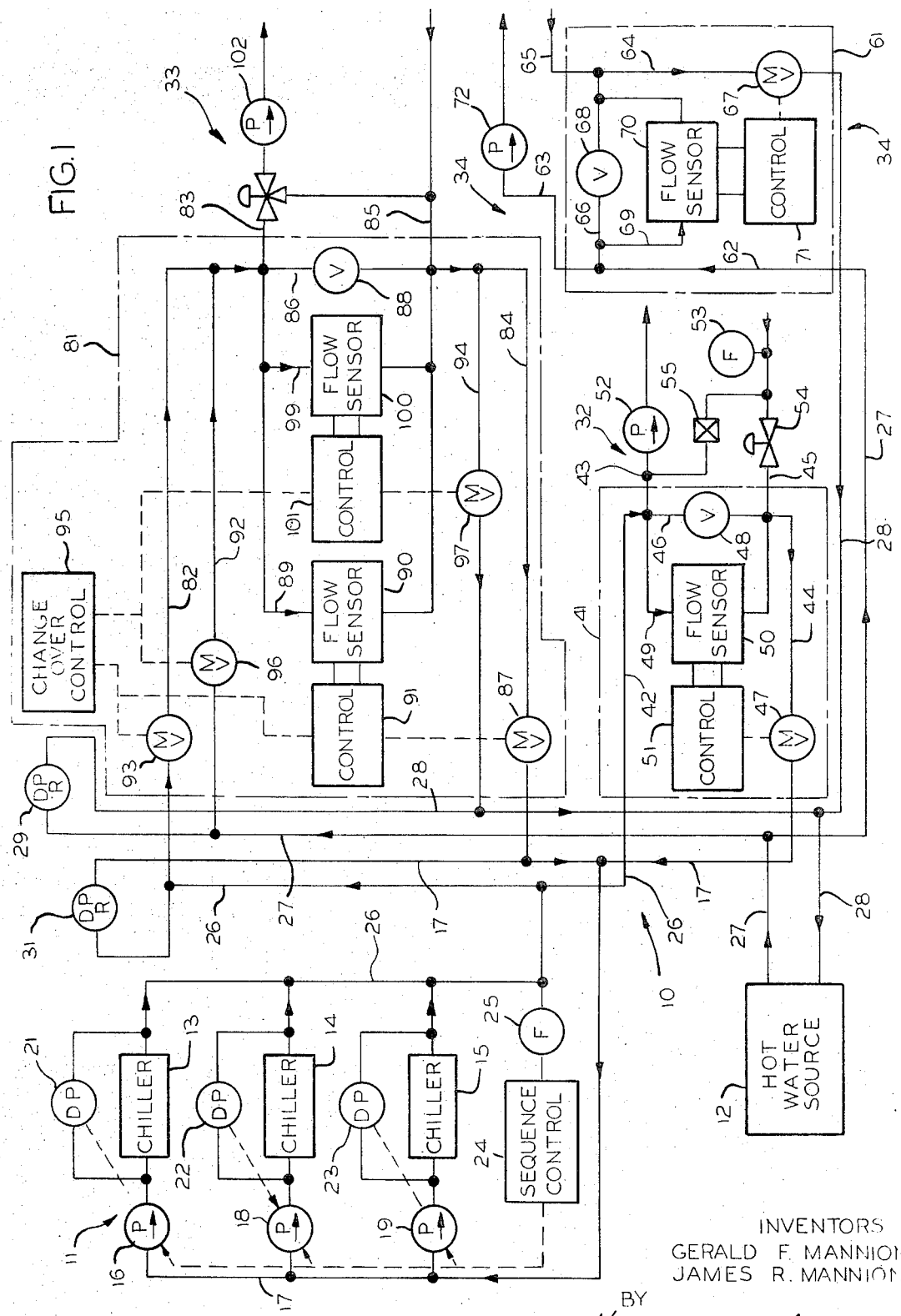
FIG. 1 is a schematic diagram of a regulated flow distribution system for incompressible process fluids constructed in accordance with one embodiment of the present invention.

FIG. 1 illustrates, in schematic form, a regulated flow distribution system 10 for incompressible process fluids that is constructed in accordance with one embodiment of the present invention and that incorporates flow regulation units constructed in accordance with the invention. Distribution system 10 comprises two process fluid sources, a chilled water source 11 and a hot water source 12. The chilled water source 11 is shown in some detail; it comprises three individual water chillers 13, 14 and 15, which may be of conventional construction. Chiller 13 is provided with an input pump 16, the inlet to pump 16 being connected to a return line 17. Similarly, the input to chiller 14 is connected to a pump 18 that is supplied from the return line 17, whereas chiller 15 has its inlet connected to a pump 19 that is also supplied from return line 17.

In the chilled water source 11, chiller 13 is provided with a differential pressure sensing device 21 that is connected to the inlet and to the outlet of the chiller. Device 21 is connected to pump 16 to shut down operation of the chiller 13 when the flow of water through the chiller is reduced to a level such that the chiller might freeze up. Similarly, chiller 14 is equipped with a differential pressure sensing device 22 connected to pump 18 to afford a safety control for chiller 14. A corresponding arrangement comprising a differential pressure sensing device 23, is provided for chiller 15 and its pump 19.

Further control for the chilled water source 11 is provided by a sequence control unit 24. Control unit 24 is actuated by a flow sensor 25 connected to a main feeder line 26 to which the outputs of all three chillers 13–15 are connected. Sequence control 24 is connected to the three chiller pumps 16, 18 and 19 to actuate those pumps in sequence and number, dependent upon the instantaneous fluid flow in feeder line 26 as determined by sensor 25. The second source of incompressible process fluid, hot water source 12, is illustrated only generally in FIG. 1. It includes appropriate apparatus for heating process water and for pumping the water into a main feeder line 27. The hot water is returned to source 12 through a return line 28. A differential pressure relief device 29 is connected between the hot water feeder and return lines 27 and 28 at the end of those lines most distant from source 12. The differential pressure relief device 29 may be of known construction and is not critical to the present invention. A similar pressure differential relief device 31 may be connected across the chilled water feeder and return lines 26 and 17.

Distribution system 10 further comprises a series of utilization stations distributed along each of the two process fluid feeder lines 26 and 27. Two utilization stations 32 and 33 are shown connected to the chilled water feeder line 26. Similarly, two process fluid utilization stations 33 and 34 are shown connected to the hot water feeder line 27. Thus, utilization station 33 is common to the two parts of the distribution system 10 comprising the chilled water feeder line 26 and the hot water feeder line 27. It should be understood that in most systems, such as system 10, there will be a much larger number of utilization stations.

A first flow regulation unit 41 is incorporated in distribution system 10 and is interposed between utilization station 32 and the distribution lines comprising chilled water feeder line 26 and its return line 17. Flow regulation unit 41 comprises a bridge inlet conduit 42 that connects the chilled water feeder line 26 to the inlet 43 of utilization station 32. Regulation unit 41 further comprises a bridge outlet conduit 44 that connects the outlet 45 of utilization station 32 to the chilled water return line 17. A first or main bridge interconnection conduit 46 interconnects the bridge inlet conduit 42 with the bridge outlet conduit 44. An isolation valve 48 is interposed in conduit 46; in normal operation, as described hereinafter, valve 48 is maintained closed. A flow regulating valve 47 is interposed in the bridge outlet conduit 44, downstream of the connection to the bridge interconnection conduit 46. Regulating valve 47 is a motorized throttling valve adapted for control in response to an electrical, pneumatic, hydraulic, or mechanical input signal.

A second or bypass bridge interconnection conduit 49 is connected between conduits 42 and 44, in parallel with conduit 46. Conduit 49 can be quite small in relation to the other bridge conduits; typically, conduit 49 may comprise tubing or pipe of ½ inch to 1 ½ inch diameter, whereas conduits 42, 44 and 46 may range up to thirty inches. Conduit 49 is incorporated in control means for continuously adjusting valve 47 to maintain the flow rate in conduit 49, which is a normally open conduit, within a limited range despite substantial changes in the absolute inlet flow rate from feeder line 26 to utilization station 32. This control means further comprises a flow sensor 50 that is interposed in conduit 49. Flow sensor 50 is preferably a device of the kind having two sensing tubes projecting into conduit 49, one oriented to sense static pressure in the conduit and the other oriented to detect dynamic pressure in the direction of flow. In addition, the control means for regulation unit 41 includes a differential comparator control 51 having two inputs connected to flow sensor 50 and having an output connected to regulating valve 47. Differential control 51 may be of conventional construction, and may afford electrical, mechanical, pneumatic or hydraulic control signals to valve 47.

Utilization station 32 is not shown in particular detail. The utilization station does include a pump 52 that controls the rate at which fluid is drawn from feeder line 26 to the chilling coils or other apparatus at the utilization station (not shown). The utilization station may include other devices, such as a flow sensor 53 and valves 54 and 55. The particular type of apparatus used at utilization station 32 is not critical to the invention, except that the utilization station apparatus does include an input pump such as pump 52.

A second flow regulation unit 61 is utilized in conjunction with utilization station 34, being interposed between the utilization station and the hot water feeder and return lines 27 and 28. Thus, flow regulation unit 61 comprises a bridge inlet conduit 62 that connects the hot water feeder line 27 to the input 63 of utilization station 34. A bridge outlet conduit 64 connects the outlet 65 of utilization station 34 to the hot water return line 28. A main bridge interconnection conduit 66 connects the bridge inlet conduit 62 to the bridge outlet conduit 64; a valve 68, maintained closed during normal operation, is interposed in conduit 66. As before, a motorized flow regulating valve 67 is interposed in the bridge outlet conduit 64 downstream of the main bridge interconnection conduit 66.

The control means for regulation unit 61 comprises a flow sensor 70 connected in an auxiliary bridge interconnection conduit 69 that is connected from the bridge inlet conduit 62 to the bridge outlet conduit 64 in parallel with the main bridge interconnection conduit 66. The flow sensor is hydraulically connected to two inputs to a differential control 71 having an output connection to the motorized regulation valve 67. No detailed construction is illustrated for utilization station 34, other than an input pump 72, since the apparatus incorporated in the utilization station may vary widely and is not critical to the present invention.

The flow regulation unit 81 for utilization station 33 in distribution system 10 is somewhat more complex than units 41 and 61 but follows the same general type of construction. The additional complexity is caused by the fact that utilization station 33 requires a supply of either chilled water or hot water, at different times, depending upon changes in the operating cycle of the utilization apparatus.

Flow regulation unit 81 comprises a first bridge inlet conduit 82 that connects the chilled water feeder line 26 to the inlet 83 of utilization station 33. A first bridge outlet conduit 84 connects the outlet 85 of utilization station 33 back to the chilled water return line 17. The bridge inlet and outlet conduits 82 and 84 are interconnected by a main bridge interconnection conduit 86. A normally closed valve 88 is interposed in conduit 86. A first flow regulating valve, shown as a motorized valve 87, is interposed in the first bridge outlet conduit 84. In addition, a cut-off valve, shown as motorized valve 93, is interposed in the bridge inlet conduit 82.

There is a second bridge in flow regulation unit 81, the second bridge comprising a second bridge inlet conduit 92 that connects the hot water feeder line 27 to the inlet 83 of utilization station 33. This second bridge further comprises a second bridge outlet conduit 94 connecting the outlet 85 of utilization station 33 back to the hot water return line 28. The bridge interconnection conduit 86 is common to both bridges, and interconnects conduits 92 and 94 as well as conduits 82 and 84. An adjustable throttling valve 97 is interposed in the second bridge outlet conduit 94. A motorized shut-off valve 96 is interposed in the second bridge inlet conduit 92.

The control means for regulation unit 81 comprises a first flow sensor 90 connected in an auxiliary bridge interconnection conduit 89 that is in parallel with conduit 86 between the bridge inlet conduit 82 and the bridge outlet conduit 84. Flow sensor 90 is connected to the two inlets of a first differential control 91. Control 91 is connected to and actuates the throttling valve 87 in bridge outlet conduit 84. Also included in flow regulation unit 81 is a second flow sensor 100, which is connected in a second auxiliary bridge interconnection conduit 99 that is in parallel with conduits 86 and 89. Flow sensor 100 is connected to an additional differential control 101 that is connected to and actuates the throttling valve 97 in the second bridge outlet conduit 94. The two controls 91 and 101 are both connected to an interlock or changeover control 95 that is also employed to actuate the shut-off valves 93 and 96 in the bridge inlet conduits 82 and 92.

Utilization station 33, like the other utilization stations, includes its own inlet pump 102. The coils, heat exchangers, and other apparatus for the utilization station have not been illustrated, since their construction, apart from pump 102, is not critical to the present invention. It will be recognized that all of the utilization stations may include auxiliary apparatus, such as isolation valves and the like, but these have been generally omitted from the drawing for purposes of simplification and clarification.

In considering operation of the dual fluid distribution system 10, initial attention may be directed to the chilled water source 11. At each of the chillders 13–15, water is pumped from return line 17 into the chiller by one of the pumps 16, 18 and 19. The resulting flow in the chilled water feeder line 26 is sensed by the flow sensor 25. If the total flow is sufficient to require the use of all three chillers, sequence control 24 maintains all of the chillers in operation. When the flow is reduced to a point at which it could be handled by two of the chillers, one chiller is removed from service by sequence control 24. If the flow is reduced further, a second chiller is placed on a standby basis by sequence control 24. The sequence control 24 is constructed to rotate usage among the three chillers.

A safety control for chiller 13 is provided by the differential pressure sensor 21 and its connection to pump 16. For most conventional chiller equipment, operation at a level below about sixty percent of the chiller capacity can lead to a freeze-up, removing the chiller from service and creating a possibility of damage to the chilling apparatus. The differential pressure control, which is usually incorporated as an integral part of commercial chiller equipment, protects against this possibility by regulating the operation of pump 16 to maintain at least a minimum pressure drop through the chiller, indicating a minimum flow, and to cut off the chiller if necessary.

In the chilled water system comprising feeder line 26 and return line 17, the differential pressure relief device 31 measures the differential in pressure between the two lines. If excessive pressure is developed in feeder line 26, as could result from a malfunction of sequence control 24 and excessive pumping of chilled water into the feeder line, relief device 31 acts to reduce the pressure differential by bypassing some of the water into return line 17. The safety control comprising differential pressure relief device 31 may be of known construction.

The actual flow of water in utilization station 32, in system 10, is controlled primarily by the utilization station itself, through control of the pump 52 and other components of the utilization station. For ideal operation, regulating valve 47 is adjusted so that there is nearly zero flow in the auxiliary bridge interconnection conduit 49. That is, under ideal conditions the regulating valve 47 allows a flow to return line 17 that exactly balances the inlet flow from feeder line 26; under these conditions, there is no flow in the auxiliary interconnection conduit of the bridge. However, any substantial change in the flow requirement of utilization station 32 requires a change in the setting of regulating valve 47 in order to maintain this optimum condition.

Flow sensor 50 measures the flow in the auxiliary bridge interconnection conduit 49. If the outputs of flow sensor 50 indicate that the flow in conduit is below a given maximum threshold value, indicating that the flow is virtually equalized in both segments of inlet conduit 42, regulation unit 41 is properly balanced and there is no need to adjust valve 47. If flow sensor 50 senses a greater flow than the aforementioned maximum threshold value, then an excess of chilled water is being supplied to utilization station 32. The resulting waste of chilled water is precluded by control 51, which detects the differential in the two outputs of flow sensor 50 and throttles down regulating valve 47 to re-establish the flow in conduit 49 at a level below the maximum threshold, thus maintaining substantial equilibrium between the primary bridge and utilization station 32.

It may also happen that the chilled water requirements for utilization station 32 increase above the available flow to return line 17 permitted by the instantaneous setting of regulating valve 47. Under these circumstances, there is a decrease in flow through the auxiliary bridge interconnection conduit 49, a decrease that is detected by flow sensor 50. If the flow sensor detects a rate of flow below a given minimum threshold, control 51 is actuated to adjust regulating valve 47 to permit a greater flow to return line 17, again balancing the system.

It is particularly important to prevent any substantial recirculation flow in utilization station 32 for an extended period of time, since recirculation may permit a substantial increase in the temperature of critical components incorporated in the utilization apparatus. Recirculation flow of any substantial magnitude is positively prevented by valve 48, which is closed for normal operation of regulating unit 41.

The operation of flow regulation unit 61 is essentially the same as described above for unit 41 except that the control is exercised with respect to heated water instead of chilled water. Control 71, operating on the basis of flow rate signals from sensor 70, adjusts valve 67 to maintain an equalized flow in the upstream and downstream portions of inlet conduit 62. As before, control 71 is adjusted to provide a very limited flow, within maximum and minimum threshold valuves, in the auxiliary bridge interconnection conduit 69.

Despite its somewhat greater complexity, flow regulation unit 81 operates in basically the same manner as units 41 and 61. Changeover control 95 is externally connected to some part of the apparatus in utilization station 33 that determines whether chilled water or heated water is required for current operation. Assuming initially that chilled water is required, changeover control 95 operates to close the shut-off valve 96 in the heated water bridge inlet conduit 92 and also operates to close the regulating valve 97 in the outlet bridge conduit 94, the latter operation being effected through control unit 101. This leaves working control to the chilled water control device 91. The differential controller 91 continuously compares the static and dynamic outputs of flow sensor 90 and adjusts the outlet regulation valve 87 to maintain a minimal flow, within predetermined limits, in bridge interconnection conduit 89. Shut-off valve 93 is maintained full open. Under these circumstances, it may be seen that control is exercised in the same manner as for either of the regulation units 41 and 61.

When the requirements of utilization station 33 change from chilled water to heated water, this change is signalled to control 95, which operates to close the chilled water inlet and outlet valves 93 and 87 and to open the heated water inlet and outlet valves 96 and 97. Control is then exercised by control unit 101, which compares the static and dynamic outputs from sensor 100 and adjusts the outlet conduit throttling valve 97 accordingly. Again, therefore, control of the heated water flow is maintained in essentially the same manner as for the simpler single-fluid regulation units.

The flow regulation units 41, 61 and 81 of distribution system 10 provide for effective utilization of bridge circuits for the individual stations along the distribution system without requiring a continuous flow of maximum quantity in the feeder and return lines of the system. There is no necessity for interconnection of the individual flow regulation units to a central control point; the controls for fluid sources 11 and 12 need not be connected to the individual utilization stations as in previously known bridge regulation systems. The individual flow regulation units, such as units 41, 61 and 81, can be readily constructed as prefabricated units adaptable for use at a variety of different utilization stations without substantial modification. For example, if the general flow ranges for utilization stations 32 and 34 are generally similar, the flow regulation units 41 and 61 can be identical in construction. Regulation unit 81, on the other hand, can be utilized without substantial change for a variety of different stations that require two different process fluids, such as hot water and cold water, in alternation.

Figure 2:
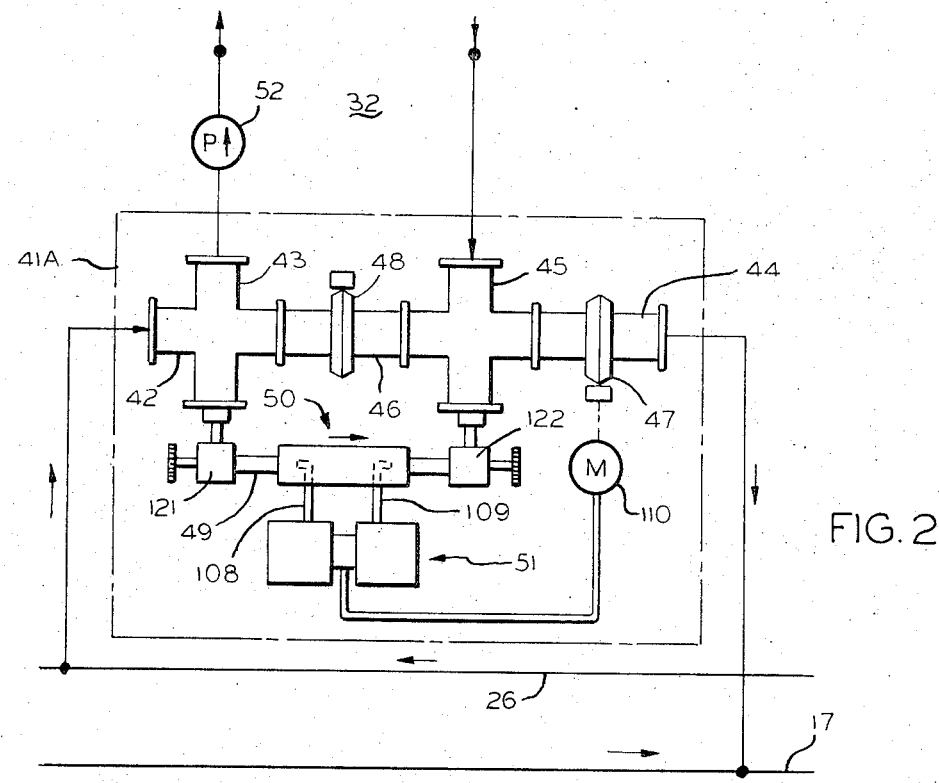
FIG. 2 is a more detailed illustration of a flow regulation unit constructed in accordance with the invention.

FIG. 2 illustrates a flow regulation unit 41A that may be substituted for either of the regulation units 41 and 61 in distribution system 10 (FIG. 1). As shown in FIG. 2, flow regulation unit 41A comprises a bridge inlet conduit 42 employed to connect the process fluid feeder line 26 to the input 43 of a utilization station 32 that includes an input pump 52. The outlet 45 of utilization station 32 is connected to the return line 17 of the distribution system by the bridge outlet conduit 44. Conduits 42 and 44 are interconnected by a main bridge interconnection conduit 46. A manually operated butterfly valve 48 is interposed in conduit 46. Valve 48 is normally maintained closed to prevent flow through conduit 46, but can be opened for flushing or for emergency operation of unit as a conventional bridge. A motor-driven regulating valve 47 is interposed in the bridge outlet conduit 44, downstream from the bridge interconnection conduit 46.

Preferably, two isolation valves 121 and 122 are incorporated in the inlet and outlet ends, respectively, of conduit 46. Valves 121 and 122 afford convenient access to flow sensor 50 and differential control 51. They may also be used as balancing valves to trim regulation unit 41A for a set flow, in effect serving to calibrate operation of the flow regulation unit in control of valve 47.

The control means incorporated in flow regulation unit 41A comprises a directional flow sensor 50 interposed in an auxiliary bridge interconnection conduit 49 that is connected in parallel with the main bridge interconnection conduit 46. Sensor 50 includes two flow sensor tubes 108 and 109, which extend into conduit 49 and are each connected to a differential control 51 that actuates regulating valve 47. Tube 108 is a dynamic flow sensor tube, and has an inlet opening facing into the direction of flow. Tube 109 is a static pressure tube, with its inlet facing downstream. The two flow sensor tubes 108 and 109 can be replaced by a unitary flow sensing apparatus if that apparatus is capable of sensing both dynamic and static pressures in conduit 46. Tubes 108 and 109 are connected to the opposite sides of the conventional differential pressure control 51, which is shown with a pneumatic output connection to actuate a motor 110 that controls the setting of valve 47.

As pointed out above, the optimum operating condition for the regulating unit bridge, in virtually all instances, is one of minimal flow in the auxiliary bridge interconnection conduit 49; usually, the flow in conduit 49 is held to about two to three percent of the anticipated flow to utilization station 32. Flow in either direction in conduit 49 can be utilized by control 51 to adjust valve 47 until a desired condition is obtained with respect to flow in conduit 49; if flow is reversed in direction, tubes 108 and 109 reverse their dynamic-static relationship. It is thus seen that control unit 41A affords the basic control requires for units 41 and 61 as described above and provides effective regulation of the fluid supply to utilization station 32.

Regulation unit 41A is easy to assemble as a prefabricated unitary device, since both of the tubes 108 and 109 of flow sensor 50 are connected to what may be a relatively short conduit, the auxiliary interconnection conduit 46. There is no need for substantial spacing from the juncture of conduits 42 and 46, as may be necessary in regulation units utilizing flow sensors located in a main conduit of the bridge.

Figure 3:
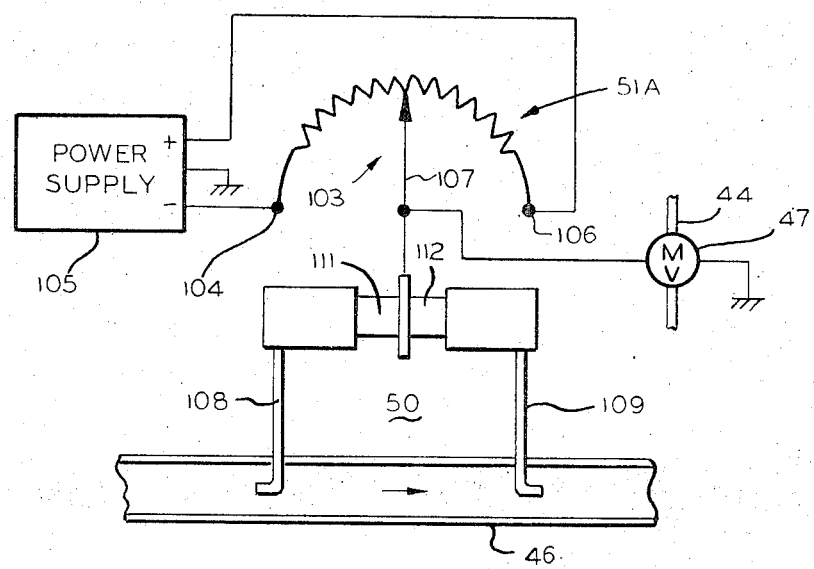
FIG. 3 is a simplified schematic drawing of one form of control device that can be used in the system of FIG. 1.

FIG. 3 illustrates, in simplified schematic form, a device 51A that may be utilized as the control 51 in regulation unit 41. As shown in FIG. 3, device 51A comprises a potentiometer 103 having a first terminal 104 connected to the negative terminal of a power supply 105 and having a second terminal 106 connected to the positive terminal of the power supply. Power supply 105 includes a ground connection. The movable tap 107 of potentiometer 103 is electrically connected to the motor of the motorized regulating valve 47, which is returned to system ground. The dynamic pressure tube 108 of flow sensor 50 actuates a plunger 111 that engages one side of the free end of potentiometer tap 107. Static flow sensor tube 109 actuates a plunger 112 that also engages the free end of the potentiometer arm, but from the opposite side.

An increase in dynamic pressure detected by sensor tube 108, exceeding the static pressure sensed by sensor tube 109, actuates plunger 111 and causes potentiometer arm 107 to pivot in a counterclockwise direction. Conversely, a decrease in the dynamic pressure (flow) sensed by sensor tube 108 causes the plungers 111,112 to rotate the potentiometer arm 107 in a clockwise direction. It can thus be seen that the energization of the motor of regulating valve 47 varies in accordance with the changes in flow rate detected by the two sensor tubes 108 and 109 of sensor 50, and this variation is utilized to adjust valve 47 until the desired limited flow in conduit 46 is achieved as described above.

The device 51A illustrated in FIG. 3 is merely exemplary of one simple form of apparatus that can be used for the comparison and control operations required in the regulating units of the invention; other control devices capable of comparing the outputs of the two sensor tubes 108 and 109 on an electrical, pneumatic, hydraulic, or mechanical basis can be utilized as desired.

FIG. 4 illustrates a modification of distribution system 10 in which thermal control is employed as the basis for regulation of the fluid flow rate to the primary and return lines 26 and 17 of the distribution system. The modification is effected in the chilled water source for the system and requires no substantial change elsewhere in the system; accordingly, only the chilled water source 11A is shown in FIG. 4.

Chilled water source 11A, as illustrated in FIG. 4, is basically similar to source 11, and comprises three individual chillers 13, 14 and 15 equipped with differential pressure sensors 21, 22 and 23 respectively. As before, chiller 13 is supplied with water from the return line 17 by means of a pump 16. Input pumps 18 and 19 are provided for chillers 14 and 15 respectively. An appropriate sequence control (not shown) may be provided.

The outputs of the three chillers 13-15 in source 11A are all connected together and are piped to form a circulating loop. Pump 151 has its inlet connected to the chiller loop outlet, the outlet of pump 151 being connected to the main chilled water feeder line 26. A feeder temperature sensor 152 is connected to feeder line 26 to continuously monitor the temperature of the water supplied to the utilization stations of the system through the feeder line. A flow sensor 153 is also connected to feeder line 26. The sensors 152 and 153 are each connected to a pump control, shown as a BTU meter 154, that controls the operation of chillers 13–15. A return temperature sensor 155 is connected to return line 17 to sense the temperature of the water being returned to chilled water source 11A; sensor 155 is also connected to the BTU meter 154. Pressure sensors 156 and 157 are connected to feeder lines 17 and 26, respectively, the sensor outputs being connected to a pressure controller 158 that controls pump 151.

In the operation of a typical chilled water system, it is desirable to maintain the temperature of the water in the cilled water feeder line 26 approximately constant. By way of example, this temperature may be taken as 45° F. There should be a substantial differential between the temperature of the water in feeder line 26 and the temperature of the water in return line 17. Thus, the system may be designed to maintain the return water temperature at about 55° F. If there is a substantial variation from these temperatures, it indicates improper or inefficient operation of the system.

For example, if the water temperature in return line 17 rises to as much as 60°, it is apparent that there is an insufficient flow of chilled water to the utilization stages of the system and that they may be heating beyond their intended operating temperatures. If the temperature of the return water drops substantially, say to 50° F, there is an excessive flow of chilled water in the system.

BTU meter 154, which regulates the operation of chillers 13-15 in accordance with the thermal information derived from sensors 152 and 155 and the flow rate information from flow sensor 153, functions to maintain an established thermal differential to assure efficient operation of the chilled water source 11A without endangering the utilization equipment connected to the system. A corresponding thermal control cannot be used in conventional bridge regulation systems without potential danger to individual utilization stages, since each stage in such a system, lacking the control afforded by flow regulation units such as units 41, 61, and 81, must be continuously supplied with chilled water at its maximum rate on a continuous basis. Although there is no direct connection between the flow regulation units and the thermal control 154 of source 11A, the thermal control, in combination with pressure control 158, provides efficient and effective regulation of the source over a wide range of different total flow requirements for the system.

A somewhat different form of flow regulation unit 241 which may be incorporated in distribution system 10 (FIG. 1) is shown in FIG. 5. Regulation unit 241 is interposed between a utilization station 232 and the distribution lines comprising chilled water feeder line 26 and its return line 17. Flow regulation unit 241 comprises a bridge inlet conduit 242 that connects the chilled water feeder line 26 to the inlet 243 of utilization station 232. Regulation unit 241 further comprises a bridge outlet conduit 244 that connects the outlet 245 of utilization station 232 to the chilled water return line 17. A bridge interconnection conduit 246 interconnects the bridge inlet conduit 242 with the bridge outlet conduit 244. A flow regulating valve 247 is interposed in the bridge outlet conduit 244, downstream of the connection to the bridge interconnection conduit 246. Regulating valve 247 is a motorized throttling valve adapted for control in response to an electrical, pneumatic, hydraulic, or mechanical input signal. In this embodiment, the bridge interconnection conduit 246 remains open at all times.

Flow regulation unit 241 further comprises control means for continuously adjusting valve 247 to maintain the flow rate in conduit 246 within a limited range despite substantial changes in the absolute inlet flow rate from feeder line 26 to utilization station 232. This control means comprises a first flow sensor 248 that is connected to bridge inlet conduit 242 upstream of the bridge interconnection conduit 246. The control means in regulation unit 241 further comprises a second flow sensor 249 connected to the bridge inlet conduit 242 downstream of bridge interconnection conduit 246. In addition, the control means for regulation unit 41 includes a differential comparator control 251 having inputs connected to both of the flow sensors 248 and 249 and having an output connected to regulating valve 47.

Utilization station 232 includes a pump 252 that controls the rate at which fluid is drawn from feeder line 26 to the chilling coils or other apparatus at the utilization station (not shown). The particular types and variety of devices used in utilization station 232 are not critical to the invention, except that the utilization station apparatus does include an input pump such as pump 252.

The flow of chilled water to utilization station 232 is controlled primarily by pump 252 and other components of the utilization station. For ideal operation, regulating valve 247 is adjusted so that there is virtually zero flow in the bridge interconnection conduit 246. That is, under ideal conditions the regulating valve 247 allows a flow to return line 17 that almost exactly balances the inlet flow to station 232 from feeder line 26; under these conditions, there is no appreciable flow in the interconnection conduit of the bridge. However, any substantial change in the flow requirement of utilization station 232 requires a change in the setting of regulating valve 247 in order to maintain this optimum condition.

Flow sensors 248 and 249 measure the flow in the inlet bridge conduit 242 upstream of interconnection conduit 246 and downstream of conduit 246. If the outputs of flow sensors 248 and 249 indicate that the flow is equalized in the two segments of inlet conduit 242, regulation unit 241 is properly balanced and there is no need to adjust valve 247. If flow sensor 248 senses a greater flow than that detected by sensor 249, then an excess of chilled water is being supplied to utilization station 232 and is being bypassed through conduit 246 to the outlet conduit 244. The resulting waste of chilled water is precluded by control 251, which detects the differential in the output of the two flow sensors 248 and 249 and throttles down regulating valve 247 to reestablish equilibrium in the flow rates in the upstream and downstream sections of inlet conduit 242.

It may also happen that the chilled water requirements for utilization station 232 increase above the flow to return line 17 permitted by the instantaneous setting of regulating valve 247. Under these circumstances, a part of the water supply already present in utilization station 232 is recirculated from the outlet 245 of the utilization station through bridge interconnection conduit 246 and back to the inlet 243 of the utilization station. The increase in flow in the downstream portion of inlet conduit 242, as compared with the upstream part of the conduit, is reflected in a differential in the flow rates detected by sensors 248 and 249. Under these circumstances, control 251 adjusts the regulating valve 247 to permit a greater flow to return line 17, again balancing the system.

As noted above, it is particularly important to prevent a recirculation flow in utilization station 232, since recirculation may permit a substantial increase in the temperature of critical components incorporated in the utilization apparatus. However, a brief recirculation occurring at the time of an increase in demand from pump 252 can be tolerated in virtually all installations, giving regulation unit 241 time to correct the imbalance. Regulating unit 241 may be adjusted with reasonable precision to establish nearly zero flow in interconnection conduit 246 or, for safety, may be calibrated to maintain a limited forward flow in the bridge interconnection conduit at all times to avoid any possibility of recirculation in the utilization station.

A modification in the flow regulation unit 41 may also be made by relocating sensor 249. If sensor 249 is connected to bridge outlet conduit 244 upstream of interconnection conduit 246, the regulation unit functions in the same manner as described above.

FIG. 6 illustrates a modification of the system of FIG. 1 that provides for the control of two process fluids, supplied to one utilization station 33, from a single flow regulation unit. That is, the apparatus illustrated schematically in FIG. 6 constitutes a replacement for the dual process fluid flow regulation unit 81 of FIG. 1.

In the modification shown in FIG. 6, there is a single flow regulation unit 341 comprising a bridge inlet conduit 342 connected to the pump 102 that supplies process fluid to utilization station 33. The regulation unit further comprises a bridge outlet conduit 344 to which the outlet of utilization station 33 is connected. A motor controlled throttling valve 347 is interposed in bridge outlet conduit 344. A main bridge interconnection conduit 346 is connected across the bridge inlet and outlet conduits 342 and 344; the flow regulation apparatus may comprise apparatus corresponding to that illustrated in flow regulation unit 41 (FIGS. 1 and 2). Alternatively, the sensing and control apparatus for flow regulation unit 341 may correspond to the arrangement described above in connection with FIG. 5.

The inlet end of the bridge inlet conduit 342 is connected, through a two-way valve 393, to each of the chilled water and hot water feeder lines 26 and 27. Similarly, the outlet end of the bridge outlet conduit 344 is connected through a two-way valve 387 to each of the cold water and hot water return lines 17 and 28. The two-way selection valves 393 and 387 are actuated by a changeover control 395.

Control 395 has two modes of operation. In one mode, it actuates valves 393 and 397 to the illustrated positions, so that the bridge feeding utilization station 33 is connected only to the chilled water supply and return lines 26 and 17. In the alternate mode of operation, changeover control 395 actuates valves 387 and 393 to connect the control bridge only to the hot water feeder and return lines 27 and 28. Since the flow regulation unit 341 is not temperature sensitive, it works equally well for supplying chilled water and heated water to utilization station 33. Thus, the flow regulation apparatus operates in the manner described above in connection with FIGS. 1, 2 and 5, controlling the fluid supply to utilization station 33 from either the chilled water source or the hot water source, without requiring two separate sets of control equipment.

We claim:

1. A flow regulation unit for a process fluid distribution system of the kind in which an incompressible process fluid is pumped from a process fluid source into a feeder line for distribution through individual flow regulation units to a series of utilization stations each including its own input pump and is returned from said utilization stations through said regulation units and a return line to said source, said flow regulation unit comprising:

a bridge inlet conduit for connecting said feeder line to the inlet of a utilization station;

a bridge outlet conduit for connecting the outlet of said utilization station to said return line;

at least one bridge interconnection conduit interconnecting said bridge inlet and outlet conduits;

a flow regulating valve interposed in said bridge outlet conduit;

and control means, including flow sensing means connected to at least one of said bridge conduits and to said regulating valve, for continuously adjusting said regulating valve to maintain the flow rate in said bridge interconnection conduit within a given limited range over a substantial range of absolute inlet flow rates.

2. A flow regulation unit for a process fluid distribution system, according to claim 1, comprising a small auxiliary bridge interconnection conduit in parallel with a large main bridge interconnection conduit, in which said flow sensing means comprises a static sensing tube and a dynamic sensing tube both connected to said auxiliary conduit.

3. A flow regulation unit for a process fluid distribution system, according to claim 2, and further comprising a normally closed cut-off valve interposed in said main bridge interconnection conduit.

4. A flow-regulation unit for a process fluid distribution system, according to claim 3, in which said dynamic sensing tube has an inlet facing toward said bridge inlet conduit and said static sensing tube has an inlet facing toward said bridge outlet conduit, and in which said control means further comprises a differential control actuated in accordance with the differential in pressures developed in said sensing tubes.

5. A flow regulation unit for a process fluid distribution system, according to claim 1, in which said sensing means comprises a first flow sensor and a second flow sensor, connected to said bridge conduits at two different points, and in which said control means includes a differential comparator for continuously comparing flow rates as sensed by said flow sensors.

6. A flow regulation unit for a process fluid distribution system, according to claim 5, in which said first flow sensor is connected to said bridge inlet conduit upstream of said bridge interconnection conduit and said second flow sensor is connected to one of said bridge inlet and outlet conduits between said bridge interconnection conduit and said utilization stage, said bridge interconnection conduit remaining open continuously during operation of said unit.

7. A flow regulation unit for a process fluid distribution system, according to claim 1, in which said sensing means is connected to said bridge interconnection conduit to sense flow therethrough in either direction.

8. A flow regulation unit for a process fluid distribution system, according to claim 1, in which said sensing means comprises two directional flow sensors, one for each direction, connected to said bridge interconnection conduit, and in which said control means adjusts said regulating valves in opposite senses in response to sensing of flow by the two directional flow sensors.

9. A flow regulation unit for a process fluid distribution system of the kind in which two different incompressible process fluids are pumped from first and second process fluid sources into first and second feeder lines for distribution through individual flow regulation units to a series of utilization stations each including its own input pump and are returned from said utilization stations through said regulation units and through first and second return lines to their respective sources, said flow regulation unit comprising:

first and second bridge inlet conduits for connecting said first and second feeder lines, respectively, to the inlet of a utilization station;

first and second bridge outlet conduits for connecting the outlet of said utilization station to said first and second return lines, respectively;

at least one bridge interconnection conduit interconnecting both of said bridge inlet conduits to both of said bridge outlet conduits;

first and second flow regulating valves interposed in said first and second bridge outlet conduits, respectively;

and first and second control means, each including flow sensing means connected to at least one of said bridge conduits and to said regulating valve, for continuously adjusting said regulating valves to maintain the flow rate in said bridge interconnection conduit within a given limited range over a substantial range of absolute inlet flow rates through either of said bridge inlet conduits.

10. A flow regulation unit for a dual-fluid distribution system according to claim 9, and further comprising first and second shut-off valves interposed in said first and second bridge inlet conduits, respectively, said control means including changeover control means to maintain said first shut-off valve and said first regulating valve closed whenever said second shut-off valve and said second regulating valve are open, and vice versa, to prevent mixing of the two process fluids.

11. A regulated flow distribution system for an incompressible process fluid comprising:

a feeder line;

a process fluid source including pumping means for pumping an incompressible process fluid into said feeder line;

a series of utilization stations distributed along said feeder line, each utilization station including its own input pump;

a return line from said utilization stations back to said source;

and a corresponding series of flow regulation units, one for each utilization station, each flow regulation unit comprising:

a bridge inlet conduit connecting said feeder line to the inlet of the utilization station with which said regulation unit is associated;

a bridge outlet conduit connecting the outlet of said utilization station to said return line;

at least one bridge interconnection conduit interconnecting said bridge inlet and outlet conduits;

a flow regulating valve interposed in said bridge outlet conduit;

and control means, including flow sensing means connected to at least one of said bridge conduits and to said regulating valve, for continuously adjusting said regulating valve to maintain the flow rate in said bridge interconnection conduit within a given limited range over a substantial range of absolute inlet flow rates.

12. A regulated flow distribution system for an incompressible fluid, according to claim 11, in which said process fluid source comprises a plurality of heat exchange units for said process fluid, said pumping means comprises a corresponding plurality of pumps each associated with one heat exchanger, and said process source further comprises a feeder flow sensor for sensing the flow of fluid in said feeder line, and a sequence control, connected to said feeder flow sensor, for actuating said pumps in sequence and in varying combinations to maintain an adequate flow of fluid in said feeder line over a given range of flow requirements for the various utilization stages of the system.

13. A regulated flow distribution system for an incompressible fluid, according to claim 11, in which said process fluid source comprises a plurality of heat exchangers for said process fluid, in which said return line is connected to the outlets of all of said heat exchangers to afford a continuous process fluid loop, in which said pumping means comprises a pump connecting said loop to said feeder line, and in which said process fluid source further comprises a feeder flow sensor for sensing the flow of fluid in said feeder line, feeder and return temperature sensors for sensing the temperature of the process fluid in said feeder line and said return line, respectively, and a thermal control, connected to said feeder flow sensor and said temperature sensors, for controlling said heat exchangers.

14. A regulated flow distribution system for an incompressible fluid, according to claim 13, in which said thermal control comprises a BTU meter.

15. A flow regulation unit for a process fluid distribution system of the kind in which two different incompressible process fluids are pumped from first and second process fluid sources into first and second feeder lines for distribution through individual flow regulation units to a series of utilization stations each including its own input pump and are returned from said utilization stations through said regulation units and through first and second return lines to their respective sources, said flow regulation unit comprising:

a bridge inlet conduit, having an inlet connected by a two-way inlet selection valve to each of said first and second feeder lines and having an outlet connected to the inlet of a utilization station;

a bridge outlet conduit having an inlet connected to the outlet of said utilization station and having an outlet connected by a two-way outlet selection valve to each of said first and second return lines, respectively;

at least one bridge interconnection conduit interconnecting said bridge inlet conduit to said bridge outlet conduit;

a flow regulating valve interposed in said bridge outlet conduit;

control means, including flow sensing means connected to at least one of said bridge conduits and to said regulating valve, for continuously adjusting said regulating valve to maintain the flow rate in said bridge interconnection conduit within a given limited range over a substantial range of absolute inlet flow rates through either of said bridge inlet conduits;

and changeover means for actuating said two-way valves to select one of said process fluids.

* * * * *